United States Patent [19]

Klementich

[11] Patent Number: 4,479,306
[45] Date of Patent: Oct. 30, 1984

[54] PROCESS OF MANUFACTURING AND USING GAUGES FOR VERIFYING THREADS OF TUBULAR MEMBERS

[75] Inventor: Erich F. Klementich, Houston, Tex.

[73] Assignee: Oil Technology Services, Houston, Tex.

[21] Appl. No.: 385,772

[22] Filed: Jun. 7, 1982

[51] Int. Cl.³ .......................... G01B 3/48; G01B 5/16
[52] U.S. Cl. ................................ 33/199 R; 33/174 Q
[58] Field of Search ............ 33/199 R, 199 B, 174 E, 33/147 M, 178 B, 172 R, 174 Q

[56] References Cited

U.S. PATENT DOCUMENTS

| | | | |
|---|---|---|---|
| 1,543,244 | 6/1925 | Blood | 33/199 R |
| 2,630,633 | 3/1953 | Webb | 33/199 R X |
| 3,047,960 | 8/1962 | Mittenbergs et al. | 33/199 R |
| 4,330,944 | 5/1982 | Maisenbacher et al. | 33/199 R |

*Primary Examiner*—Harry N. Haroian
*Attorney, Agent, or Firm*—Vaden, Eickenroht, Thompson, Bednar & Jamison

[57] ABSTRACT

A ring gauge is made from the box end of an authenticated precision threaded member and a plug gauge is made from the pin end thereof. The pin end is machined laterally and radially at its nose to ensure complete engagement of the threads. The box end is machined laterally and radially at its internal shoulder for a similar reason. A plunger-activated seal-diameter gauge operates through a radial hole in each of the ring gauge and plug gauge thus made, so that the plungers contact the sealing surface of a measured pin end or box end. Similarly, a plunger-activated standoff gauge operates through a longitudinal opening of the ring gauge and of the plug gauge, the plungers effectively providing a measurement of standoff between the tip of the pin end being measured and the internal surface of the ring gauge shoulder or comparable standoff of the box end. Tabulated measurements of seal diameter and standoff provide data for determining the optimum number of acceptable fits between the pin ends and box ends from a plurality of measured tubular members. Similar gauges, but segmented with a gap, are used to measure taper of the measured threads. The gap size in the gauge determines if the measured taper is slow or fast relative to nominal and, if calibrated, an absolute measurement of taper.

16 Claims, 11 Drawing Figures

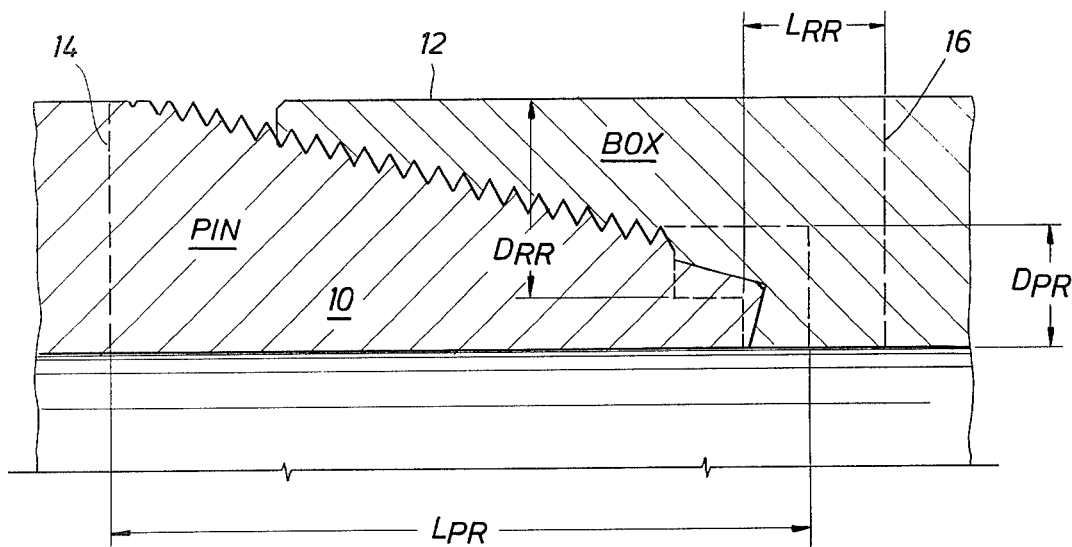
FIG.1
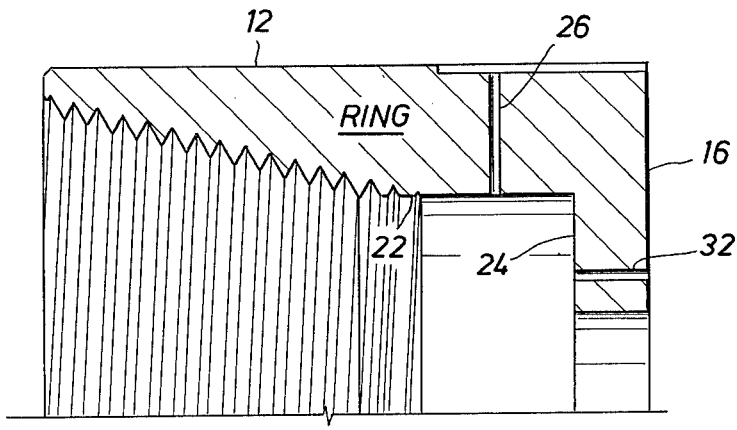
FIG.2
FIG.3
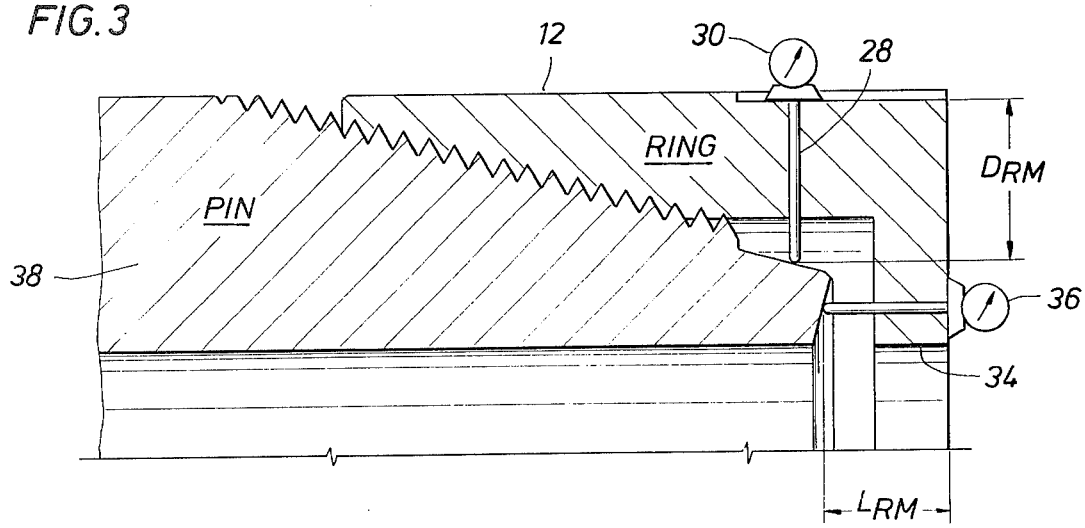

PROCESS OF MANUFACTURING AND USING GAUGES FOR VERIFYING THREADS OF TUBULAR MEMBERS

BACKGROUND OF THE INVENTION

1. Field of the Invention

This invention pertains to thread garuges for the measurement of and/or the verification inspection of the threads on the pin ends and box ends of tubular members and more specifically to the manufacturing of a suitable gauge for that purpose when the conformation of the threads are proprietary or unknown for any reason.

2. Description of the Prior Art

Pipe sections or joints, casings, tubings, or other tubular members used in the oil and gas industry or otherwise normally include a pin end and a box end, the threads of which are intended to be threaded to be complementary and are manufactured in accordance with specified standards to provide secure joints. The most important characteristics of a joint connection that determines that there is a good seal when joints are made up are (1) that the threads mate so as to engage uniformly, and (2) that the threads mate at a sufficient depth so that adverse stresses in making up joints and using such joints are avoided.

The following discussion assumes that it has been previously determined that the lead on the screw threads are uniform. That is, the threads are within tolerances so that there are the correct and same number of threads per inch for each pin end and box end in the plurality of tubular members to be verified and classified in accordance with the invention hereinafter described. Such thread measurement is readily accomplished by a simple gauge that fits into the threads and makes this determination.

However, this is not a sufficient verification since the taper and relative sizes of mating pin end and box end can be such to cause high stresses and other problems. If the box end taper is correct, but the pin end taper is "slow" (too gradual), then the two ends tend to cause a pressure point near the tip of the pin end. This could cause compressional yielding and eventual pin end failure. On the other hand, if the pin end taper is "fast" (too steep), then the peak pressure point can be too near the outer rim of the box end, thereby possibly causing hoop tensile failure of the box end. Of course, a correct pin end taper meeting with a slow or fast box end taper would have correspondingly similar results.

Mating threads of slightly different pitch diameter present another problem. If the pin end threads have an oversized pitch diameter with respect to the box end threads, then the pin end will not completely make up in the box end at normal power make up pressure. Forcing a further make up will cause either or both metal breakage at the crests or gouging at the roots of the mating threads. Furthermore, if the pitch diameters are sufficiently mismatched, material failure of either or both the pin end and box end could occur. If the pin end threads are undersized in pitch diameter with respect to the box end threads, then an insufficient metal-to-metal seal is effected, resulting in possible leakage around the threads and/or a failure (separation) to the thread crests since only a shallow portion of the threads carry the load, Although there are many standard threads with designated tapers, pitches, pitch diameters, clearances, allowances and the like, there are also proprietary threads in service. The quality standard do not always screen out tubular members that have threads which are out of tolerance in one or more of the aforementioned areas. Although it is possible for a distributor or user of the tubular members to find gauges for verifying "standard" threads, such gauges available in the marketplace tend to be expensive, not readily available and potentially inconvenient to use. Of course, there may not be any gauges available at all for "proprietary" threads. Furthermore, even if it is assumed that all of the tubular members to be used at a job are within individual tolerance, it is readily apparent that a larger number of better connections can be made by ascertaining the taper conditions and the pitch diameters and then selectively matching the pin ends with the box ends. Such matching also avoids a connection of two marginal mating parts that are on the edge of the tolerance limits in opposite directions.

It is very important at the mill or at the yard to which tubular members are delivered or even in the field where the tubular members are used to be able to verify that the threads are suitably within tolerance to mate with one another so that consecutive joints make up completely and that a thorough metal-to-metal seal had been accomplished. Although sophisticated gauges are available at the mill to employ during the machining operation, heretofore there has not been a simple, yet sufficiently accurate, method of assuring that the threads of both the pin ends and of the box ends of a plurality of supposedly "identical" sections of tubular members are of such uniformity that satisfactory junctions are obtained when these members are randomly joined together.

Therefore, it is a feature of the present invention to provide an improved gauge for use on a plurality of tubular members for verifying their acceptability and maximizing their relative fit, even when the thread conformation is unknown.

It is another feature of the present invention to produce an improved gauge for such purpose from a known tubular member section whose threads are within the acceptable limits established for the plurality of tubular members.

It is yet another feature of the present invention to produce improved ring and pin gauges for determining "seal diameter" and "standoff" dimensions for a plurality of tubular members, which gauges are readily used in the field.

It is still another feature of the present invention to produce improved ring taper and plug taper gauges for determining pin end taper and box end taper for a plurality of tubular members, which gauges are readily used in the field.

SUMMARY OF THE INVENTION

A premier tubular member is first normally selected which is authenticated as being within the mid-range of acceptable screw threads. This tubular member is then cut to remove the pin end and the box end which will be made into the gauges for the plurality of tubular members to be verified. The pin end is slightly machined to flatten its nose and to remove some external surface metal at its tip. These reductions assure that the pin end will screw completely into the box end so that their threads will engage to their fullest intended depth. It should be recognized since the threaded turns are on tapered surfaces, initially the threads will make a shallow engagement, but as they are tightened, the engagement of each screw thread turn becomes greater. Finally, the fit is sufficiently thorough under the intended make up pressure conditions that further axial tightening shrinks the pin end and/or expands the box end. The use of the gauges in accordance herewith anticipates that the threads will be made up under hand tight conditions, which is less, of course, than the pressure normally applied in actual make up service. By removing metal from the pin end at the areas mentioned, premature binding before this degree of tightening is accomplished is avoided. The box end is similarly machined at its pocket surface opposite the machined tip periphery and at its shoulder, longitudinally opposite the end of the pin end. These ends are then coated, preferably electroless plated with nickel-phosphate or other suitable plating, to protect the gauge parts against wear.

A small lateral or radial hole is drilled or bored through the box end (which becomes the ring gauge) so that the hole internally opens opposite the machined portion of the pin end tip. Another small longitudinal hole is drilled or otherwise bored through the shoulder of the box so that the hole opens opposite the tip of the pin end. Mounting grooves are made for the mounting of two dial gauges.

The plunger of a first dial gauge for making comparison readings of seal diameters for pin ends to be verified is inserted through the lateral hole and the plunger of a second dial gauge for making comparison readings of standoff (distance from pin end to internal shoulder of box end) is inserted through the longitudinal hole.

The ring gauge thus made is used for measuring the seal diameters and standoffs for the pin ends of the plurality of tubular members. The pin end (which becomes the plug gauge through a comparable procedure to that outlined above for the ring gauge) is used for measuring the internal seal diameters and standoffs of the box ends for the plurality of tubular members.

By tabulating the results of the gauging, obviously out-of-tolerance members can be eliminated. However, in addition, the maximum number of optimum fits can also be made since the suitability of the junction is dependent on how a selected pin end fits within a selected box end.

A ring taper gauge and a plug taper gauge can also be made from a selected premier tubular member. The box end and pin end are prepared in similar fashions to that described above through the steps of machining and coating or plating. A lateral slice is then removed from the gauges through the thread area, the slice, for convenience, being of a known width. The slice is discarded and the remaining severed part or portion is rotatably mounted a slice-width distance from the main body of the gauge in such a manner that it can freely move closer to or further from the main body. When the gauge thus made is rotatably engaged with respect to a verified or measured pin end (or box end), a perfect taper will be shown by an alignment of the gauge parts at the slice distance. A slow taper will result in the portions having a gap therebetween greater than the thickness of the removed slice and a fast taper will result in the portions having a gap therebetween narrower than the thickness of the removed slice.

By calibrating or precision measurement of the gap, the exact tapers can be determined and tabulated for matching purposes, as with the seal diameter and standoff tabulations.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the drawings:

FIG. 1 is a partial cross-sectional view of a box end and pin end of a tubular member fitting together in typical fashion prior to making a ring gauge and a plug gauge therefrom.

FIG. 2 is a cross-sectional view of a ring gauge made in accordance with the present invention.

FIG. 3 is a ring gauge as shown in FIG. 2 in a use application measuring the pin end of a tubular member.

DESCRIPTION OF PREFERRED EMBODIMENTS

Figure 4:
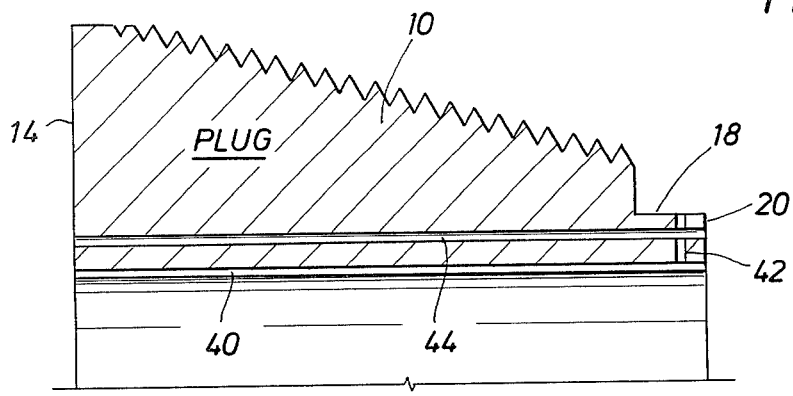
FIG. 4 is a cross-sectional view of a plug gauge made in accordance with the present invention.

Now referring to the drawings and first to FIG. 1, a pin end of a typical tubular member is shown tightened into the box end 12 of the same tubular member if the tubular member is first separated to permit this, or, alternatively, of a second tubular member. The ring gauge to be described more fully hereinafter is made from the selected box end of a tubular member and the plug gauge to be described more fully hereinafter is made from the pin end of a selected tubular member, and, hence, the numbering sequence established in FIG. 1 is maintained for the other figures. So that the most representative tubular member is used for the tubular gauge, it is recommended that a premier tubular member within the mid-acceptable-range of tolerance for the threads to be verified is selected from which to make the gauges. However, as will be seen, the modifications of the pin and box ends to make them into the ring and plug gauges are such that any acceptable tubular member can be used. The measurements to be made on a plurality of measured tubular members are relative to each other, hence, the gauges do not have to be a standard dimension.

The first step in making the gauges from the selected tubular member is to cut pin end 10 from the tubular member at radial line 14. In similar fashion, box end 12 is cut from the tubular member at radial line 16. The peripheral surface at the tip of the pin end is machined to provide a surface 18, which is parallel to the axis of the pin end. In addition, the nose of the tip end is machined off to leave a transverse normal or radial surface 20.

In similar fashion, box end 12 is machined at pocket surface 22 to leave a machined parallel surface to the axis of the ring gauge in the vicinity opposite the machined off tip of pin end 10. Shoulder 24 is machined to leave a normal or radial surface longitudinally opposite the nose end of the pin end.

The ring gauge thus far made and the plug gauge thus far made are then hand tightened together, such as can be shown again with reference to FIG. 1. The seal diameter reference for the plug gauge, labeled "$D_{PR}$" is the radial distance between the internal surface of pin 10 and machine surface 22. The longitudinal or standoff reference dimension, sometimes also referred to as the length reference dimension, for the plug gauge is the distance from surface 14 to machine surface 24 on the ring gauge. This dimension is labeled "$L_{PR}$" in FIG. 1.

In similar fashion, the seal diameter reference dimension for the ring gauge is from the external peripheral surface of the ring gauge to machine surface 18 on the plug gauge. This dimension is labeled "$D_{RR}$" in FIG. 1. The longitudinal standoff or length reference dimension for the ring gauge is the distance between surface 16 on the ring gauge to surface 20 on the plug gauge. This dimension is labeled "$L_{RR}$" in FIG. 1.

Referring now to FIG. 2, the two outside surfaces of ring gauge 12 which are opposite machine surfaces 22 and 24, respectively, can be suitably grooved or otherwise prepared for receiving dial gauges for indicating the measurements which are referred to hereafter. For clarity and to illustrate the flexibility of design only the groove on the periphery (O.D. surface) is shown on ring gauge 12. This preparation, e.g., grooving, may be by any convenient means, many of which are well known in the art.

A hole or opening is drilled or otherwise bored in a transverse, radial, direction from the outside surface through machine pocket surface 22. This bore is referred to as hole 26 in FIG. 2 and is slightly larger than plunger 28 of dial gauge 30, which is illustrated in FIG. 3 as being mounted in the mounting groove provided.

In similar fashion, a bore opening 32 is made in a longitudinally direction from surface 16 to surface 24 so as to accommodate plunger 34 of dial gauge 36 suitably mounted in the groove for such purpose made in surface 16. The opening on the internal surface of bore opening 32 is opposite the pin ends of the tubular members to be measured.

Now turning to FIG. 3, it may be seen that the ring gauge has been rotatably engaged with the pin end of a tubular member 38 until it is in the hand tightened position. Plunger 28 of dial gauge 30 passes through opening 28 and bears on the tapered nose surface of the pin end of tubular member 38. It is apparent that the plunger distance to the tapered surface is less than the distance of the plunger to surface 18 when ring gauge 12 and plug gauge 10 are tightened together, since there is no part of the tapered nose removed from tubular member 38. Therefore, if "$D_{RR}$" (diameter ring reference), is taken as a reference zero point, then the reading of dial gauge 30 "$D_{RM}$" diameter ring measurement), can be taken a measure of the relationship to that dimension and is a measure of seal diameter for measured tubular member 38.

In similar fashion, the plunger of longitudinal or standoff dial gauge 36 bears against the nose surface of the pin end of member 38 and is less than the distance "$L_{RR}$" (length ring reference), as set forth in FIG. 1. Therefore, the "$L_{RM}$" measurement, which stands for length ring measurement, becomes a measure of standoff for comparision purposes with other measured tubular members.

Figure 5:
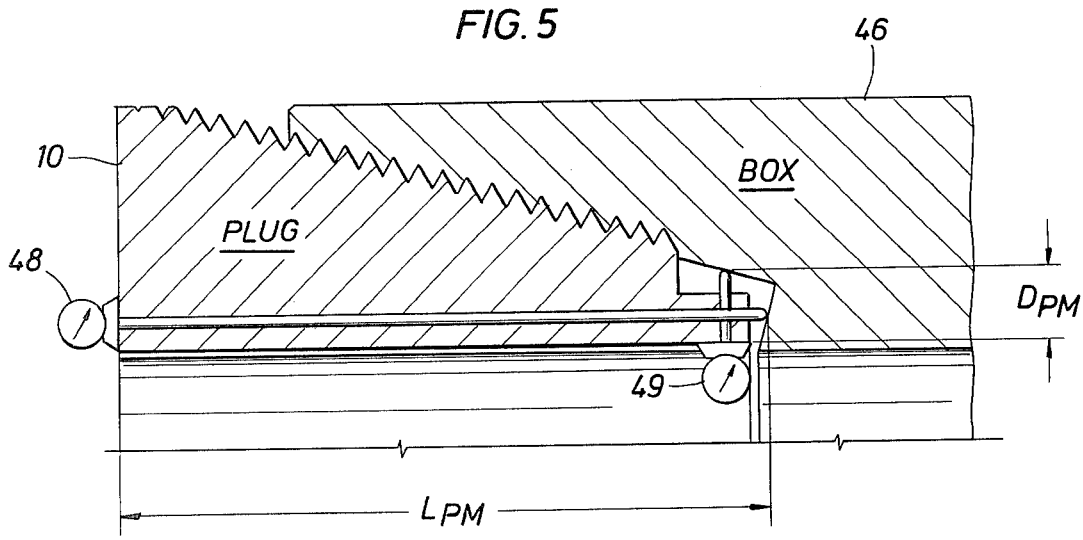
FIG. 5 is a plug gauge as shown in FIG. 4 in a use application measuring the box end of a tubular member.

Now referring to FIG. 4, a plug gauge is shown with a prepared surface at surface 14 and along the internal surface 40, grooved in this case, of the plug gauge each for accommodating a dial gauge, 48 and 49, respectively, such as shown in FIG. 5. A port or hole 42 is drilled or otherwise bored in a radial direction through the tip of the pin end. The internal opening of hole 42 must be aligned with the seal surface of a measured pin and, thus, with surface 22 of the ring gauge when the ring gauge and the plug gauge are joined together. In similar fashion, a bore hole is drilled or otherwise bored longitudinally through the plug gauge so as to open up internally on face 20 opposite shoulder surface 24 of ring gauge 12 when ring gauge 12 and plug gauge 10 are joined together. Although illustrated in FIG. 4 as intersecting for convenience, holes 42 and 44 are rotationally offset so this does not occur.

Now referring to FIG. 5, please note that the dimension "$D_{PR}$" (diameter plug reference), is longer than any dimension "$D_{PM}$" (diameter plug measurement) of a box end 46 to be measured or verified by plug gauge 10. This is because box end 46 has not been machined out as has been the ring gauge. Therefore, the zero setting is the "DPR" distance and the "$D_{PM}$" measurement is a comparision measurement for use in tabulation as applied with respect to other measured box ends.

In similar fashion, distance "$L_{PM}$" (length plug measurement), which is the distance of the plunger of standoff gauge 48 to the actual box end internal shoulder, is a shorter distance than distance "$L_{PR}$" (length plug reference), shown in FIG. 1. The distance "$L_{PR}$" is the distance to machine shoulder 24 of the ring gauge. Again, the "$L_{PM}$" measurements become comparision measurements for comparing the plurality of box ends which are measured by the same plug gauge. When the sealed diameter measurements recorded on dial 30 and the standoff readings recorded on dial 36 are made for a statistical universe of tubular members, a bell-shaped curve will result. Likewise, a statistical universe of box ends measured in accordance with the procedure illustrated in FIG. 5 will also result in a bell-shaped curve for the indications recorded from dial gauges 48 and 49. The tubular members which are selected to be too far away from the center point of these curves may be rejected, as selected by the operator of the gauges just described. Moreover, it may be seen that by selectively choosing the tubular members from the tabulations, a maximum optimizing of fits may be made. It has been found that such selection by a statistical analysis of the measured data can result in a three- to four-fold improvement in overall tolerances than nonselected fitting of the box ends and pin ends.

Figure 6:
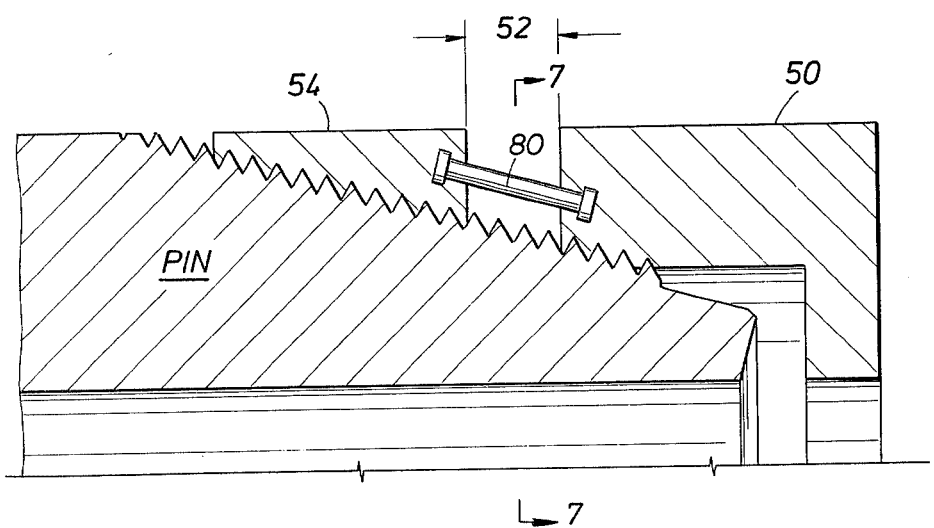
FIG. 6 is a partial cross-sectional view of a ring taper gauge made in accordance with the present invention.
Figure 7:
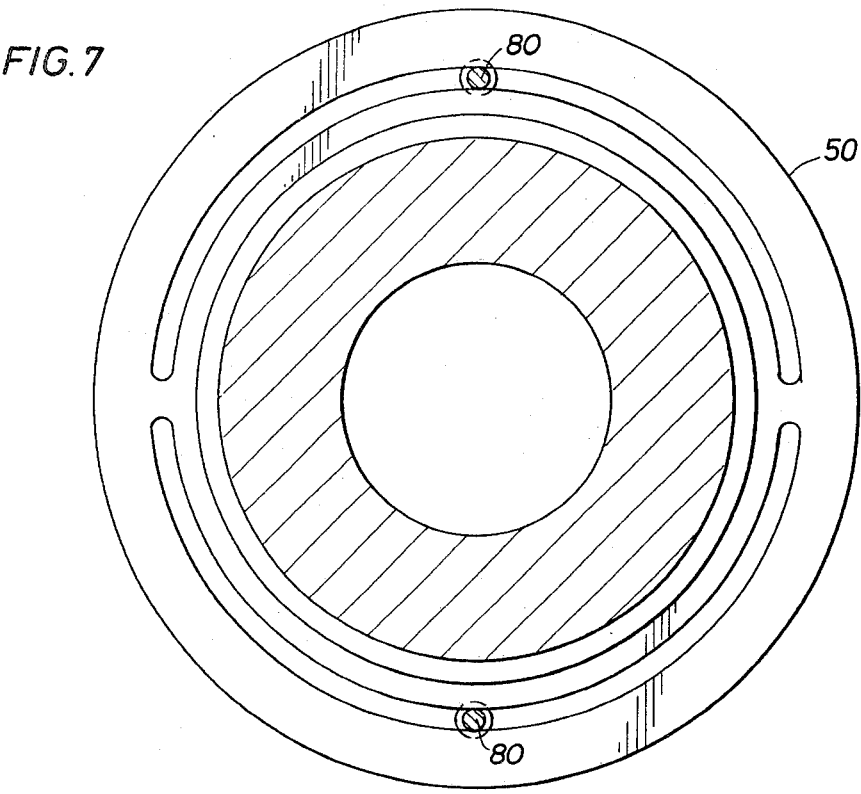
FIG. 7 is a view taken at 7—7 of the view shown in FIG. 6.

Now referring to FIG. 6, it is first assumed that a ring gauge is made in a manner which is similar to ring gauge 12 previously described, up to the step of grooving to receive the dial gauges. This ring gauge, however, is to be made into a taper gauge and is identified in FIG. 6 as ring taper gauge 50. When this gauge is screwed over the pin end of a premier tubular member, a premier tubular member being one which is very near the mid-range of the desirable thread characteristics, there is even mating or pressure along the entire surface as the point of hand tightening occurs. A lateral slice 52 is measured and then removed from ring taper gauge 50, the slice having lateral or radial surfaces. The opposing surfaces are then circularly grooved (as shown in FIG. 7) and retaining screws 80 are placed therein along an axis which is parallel to the taper axis of the threads. The removed or separated portion 54 is then rejoined to the main body of ring taper gauge 50. When the ring taper gauge is turned back over the premier pin end in the condition just mentioned, then the gap or space between the opposing portions of the ring taper gauge will be the exact distance of the piece that was removed therefrom.

Figure 8:
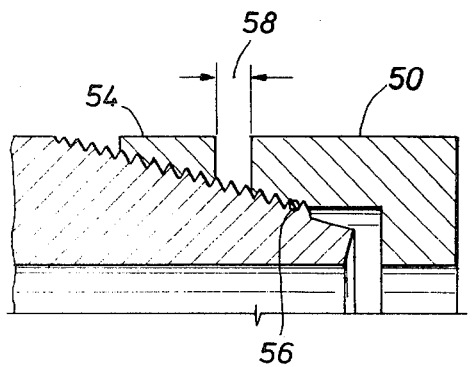
FIG. 8 is a partial simplified cross-sectional view of a ring taper gauge in accordance with the present invention measuring a pin end with a slow taper.

Now referring to FIG. 8, it may be seen that when ring taper gauge 50 is tightened on a pin end of a tubular member with a slow taper, a pressure point at 56 is created which is very near the tip of the pin end being measured. Since the two portions of the gauge are free to tighten independently of one another on the threads of this pin end, tightening of end 54 of the gauge results in a gap spacing 58 which is greater than the nominal gap spacing shown in FIG. 6. This is an indication of a slow taper. By calibrating the gauge, the exact amount of taper can be determined.

Figure 9:
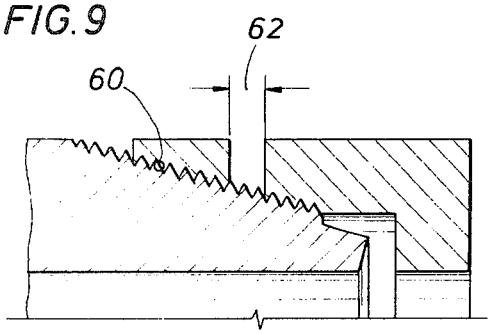
FIG. 9 is a partial simplified cross-sectional view of a ring taper gauge measuring a pin end with a fast taper.

In similar fashion, as shown in FIG. 9, a fast taper results in a pressure point 60 and a gap 62 which is smaller than the nominal gap shown in FIG. 6. Again, with calibration, the exact amount of taper can be determined.

Figure 10:
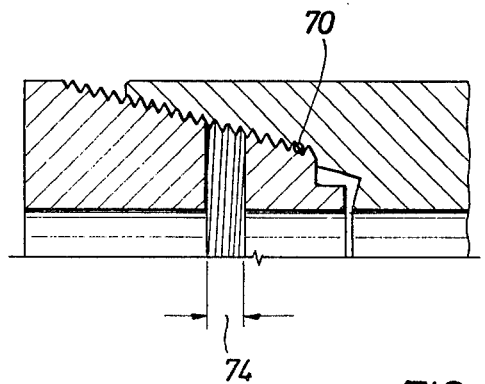
FIG. 10 is a partial simplified cross-sectional view of a plug taper gauge in accordance with the present invention measuring the box end with a fast taper.
Figure 11:
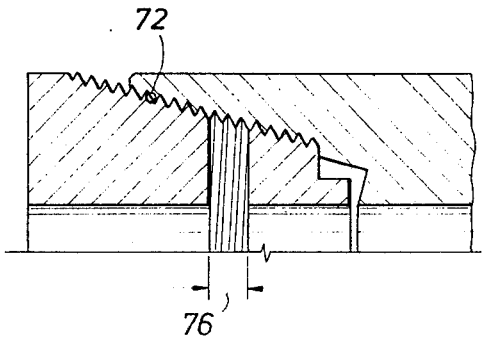
FIG. 11 is a partial simplified cross-sectional view of a plug taper gauge measuring a box end with a slow taper.

FIGS. 10 and 11 illustrate a comparable plug taper gauge which has a nominal gap resulting from a radial slice section taken from the gauge through the thread portion. For the fast tapered surface of the box end measured in FIG. 10, there is a pressure point 70 which puts pressure near the tip end of the gauge or a related accommodated pin end. Similarly, a slow taper results in a pressure point 72 which is near the outer limits of the measured box.

The plug gauge which is illustrated which results in a gap 74 which is smaller than nominal, indicates a fast taper and a gap 76 which is larger than nominal, indicates a slow taper for a measured box end. By calibration, the exact taper can be determined.

It should be noted that tapers which are too slow or too fast result in potential damage to either the pin end or the box end. For instance, a relatively slow pin end will result in the pin end being put under a compressional force that may cause compressional fatigue thereof. In a similar fashion, a relatively fast taper of a pin end will result in the box end being put in hoop tensile stress which also can result in high stress.

By recording the measured tapers, the plurality of tubular members which are measured can be put into a statistical universe and the tolerance limits selected to discard those outside of an allowable range. Recording may be merely by categorizing the tapers as "fast", "normal" and "slow" or, when calibrated, the exact measurements can be recorded. Then, as with the sealed diameter and standoff tabular results, the ends can be selectively joined together so as to accomplish better fits than random fits by an order of three or four to one.

It has been discovered that the gauges made in the manner just described work more reliably and efficiently over a long period of time when they are coated for wear resistance. An electroless plating with nickel-phosphate is a well-known chemical process that produces an even coating thickness, even at sharp edges, whereas electroplating is not as satisfactory. This coating is known in the art as ENC.

When a large number of tubular members are to be measured, it has been found preferred to make a working set of gauges and a master set. Then, after a nominal number of measurements, like 10 or 20, the working gauges are recalibrated with respect to the master gauge. Furthermore, recoating and recalibration should be done after every 100 or so measurements with the working gauges.

Although the dial gauges can be any convenient types, seal diameter gauge 49 may conveniently be mini-Starret gauges and gauge 30 and longitudinal or standoff gauges 36 and 48 may conveniently be regular Starret dial gauges. These gauges permit readings to be made at 1/1000" accuracy.

Also, instead of calibrating the gap of the ring taper and the gap of the plug taper gauge, alternatively, suitable vernier calipers for measuring the gap may be used. If only coarse measurement is desired, a simple insert can be made for determining if the gap is nominal or too large or too small.

Although the gauges are particularly suited for evaluating and selectively mating tubular members with unknown threads since no foreknowledge of the threads is required, the gauges are perfectly suitable for evaluating and classifying API threads or other threads of known conformation.

While a particular embodiment of the invention has been shown it will be understood that the invention is not limited thereto, since many modifications may be made and will become apparent to those skilled in the art.

What is claimed is:

1. A ring gauge for verifying the acceptability of the seal diameter and standoff of the pin ends of a plurality of tubular members intended to be uniformly threaded, said gauge being made from a selected tubular member having box and pin ends with threads within acceptable tolerance limits, said gauge being made from a process, which comprises cutting the pin end and box end from the selected tubular member, machining a pocket surface in the box end radially away from the tip of the pin end, to remove material therefrom so as to insure substantially full engagement of the threads when the pin end and box end are hand tightened together, machining out the shoulder of the box end longitudinally away from the end of the pin end, thereby assuring the existance of standoff when the pin end and box end are hand tightened together, boring a lateral hole through the wall of the box end, the hole internally opening slightly behind the tip of the pin end, boring a longitudinal hole through the shoulder in the box end, the hole internally opening longitudinally opposite the end of the pin end, inserting the plunger of a seal-diameter gauge through said lateral hole for measuring the seal diameters of the pin ends of said plurality of tubular members, and inserting the plunger of a standoff gauge through said longitudinal hole for measuring the standoffs of the pin ends of said plurality of tubular members.

2. A ring gauge made by the process of claim 1, wherein the machining of the pocket of the box end leaves a longitudinal surface parallel to the axis of the ring gauge.

3. A ring gauge made by the process of claim 1, wherein the machining of the shoulder of the box end leaves a normal surface to the axis of the ring gauge.

4. A ring gauge made by the process of claim 1, and including coating the threaded surface of said ring gauge to provide wear resistance.

5. A ring gauge made by the process of claim 1, and including chemically plating the threaded surface of said ring gauge with hard coating to provide the surface with a uniformally dimensioned protective layer.

6. A ring gauge made by the process of claim 5, wherein said hard coating is nickel-phosphate.

7. A ring gauge made by the process of claim 1, wherein the threads of said selected member are chosen to be within a narrow mid-range of acceptable tolerance limits.

8. A plug gauge for verifying the acceptability of the seal diameter and standoff of box ends of a plurality of tubular members intended to be uniformly threaded, said gauge being made from a selected tubular member having box and pin ends with threads within acceptable tolerance limits, said gauge being made from a process, which comprises cutting the pin end and box end from the selected tubular member, machining the diameter of the tip of the pin end to remove material therefrom so as to ensure substantially full engagement of the threads when the pin end and box end are hand tightened together, machining off the nose of the pin end to shorten its longitudinal dimension, thereby assuring the existence of standoff when the pin end and box end are hand tightened together, boring a lateral hole through the tip of the pin end, the hole externally opening opposite the pocket surface of said box end, boring a longitudinal hole through the wall of the pin end including the end of the pin end, the hole at the pin end opening longitudinally opposite the shoulder of the box end, inserting the plunger of a seal-diameter gauge through said lateral hole for measuring the seal diameters of the box ends of said plurality of tubular members, and inserting the plunger of a standoff gauge through said longitudinal hole for measuring the standoffs of the box ends of said plurality of tubular members.

9. A plug gauge made by the process of claim 8, wherein the machining of the diameter of the tip of the pin end leaves a longitudinal surface parallel to the axis of the plug gauge.

10. A plug gauge made by the process of claim 8, wherein the machining of the nose of the pin end leaves a normal surface to the axis of the plug gauge.

11. A plug gauge made by the process of claim 8, and including coating the threaded surface of said plug gauge to provide wear resistance.

12. A plug gauge made by the process of claim 8, and including chemically plating the threaded surface of said plug gauge with hard coating to provide the surface with a uniformly dimensioned protective layer.

13. A plug gauge made by the process of claim 12, wherein said hard coating is nickel-phosphate.

14. A plug gauge made by the process of claim 8, wherein the threads of the selected member are chosen to be within a narrow mid-range of acceptable tolerance limits.

15. The process of optimizing the pin end to box end fit for the maximum number of plurality of tubular members threaded within an acceptable dimensional range, comprising making a ring gauge and a plug gauge respectively from a selected tubular member having a box end and a pin end with threads within acceptable tolerance limits, said ring gauge including a first measurement means for measuring seal diameter and a second measurement means for measuring standoff of pin ends for the tubular members and said plug gauge including a third measurement means for measuring seal diameter and a fourth measurement means for measuring standoff of box ends for the tubular members, measuring the seal diameter and standoff dimensions for each of the pin ends of said plurality of tubular members using said ring gauge, measuring the seal diameter and standoff dimensions for each of the box ends of said plurality of tubular members using said plug gauge, and selectively matching the measured tubular members to ensure the optimum engagement fits among the largest number of individual tubular members.

16. The process in accordance with claim 15, and including making a ring taper gauge and a plug taper gauge respectively from a second selected tubular member having a box end and pin end with acceptable taper tolerance limits, said ring taper gauge measuring the taper of the pin ends for the tubular members and said plug taper gauge measuring the taper of the box ends for the tubular members, measuring the taper for each of the pin ends of said plurality of tubular members using said ring taper gauge, measuring the taper for each of the box ends of said plurality of tubular members using said plug taper gauge, selectively matching the measured tubular members to further ensure the optimum engagement fits including taper fit among the largest number of individual tubular members.

* * * * *